United States Patent
Beni

(10) Patent No.: US 9,827,548 B2
(45) Date of Patent: Nov. 28, 2017

(54) BAFFLE ASSEMBLY FOR A REACTOR

(71) Applicant: Ali Aghababai Beni, Ben (IR)

(72) Inventor: Ali Aghababai Beni, Ben (IR)

( * ) Notice: Subject to any disclaimer, the term of this patent is extended or adjusted under 35 U.S.C. 154(b) by 0 days.

(21) Appl. No.: 15/118,081

(22) PCT Filed: Jun. 19, 2015

(86) PCT No.: PCT/IB2015/054651
§ 371 (c)(1),
(2) Date: Aug. 10, 2016

(87) PCT Pub. No.: WO2016/001791
PCT Pub. Date: Jan. 7, 2016

(65) Prior Publication Data
US 2016/0354750 A1    Dec. 8, 2016

(30) Foreign Application Priority Data

Jul. 2, 2014   (IR) .................. 139350140003003708

(51) Int. Cl.
| | | |
|---|---|---|
| *B01J 19/00* | (2006.01) | |
| *B01F 15/00* | (2006.01) | |
| *B01F 5/06* | (2006.01) | |
| *B01J 19/18* | (2006.01) | |
| *B01J 19/12* | (2006.01) | |
| *B01F 7/16* | (2006.01) | |

(52) U.S. Cl.
CPC ............ *B01J 19/006* (2013.01); *B01F 5/066* (2013.01); *B01F 7/1685* (2013.01); *B01F 15/00538* (2013.01); *B01F 15/00831* (2013.01); *B01J 19/123* (2013.01); *B01J 19/18* (2013.01); *B01F 2215/0036* (2013.01); *B01J 2219/00051* (2013.01); *B01J 2219/00081* (2013.01); *B01J 2219/00162* (2013.01); *B01J 2219/00164* (2013.01); *B01J 2219/00177* (2013.01); *B01J 2219/00768* (2013.01); *B01J 2219/00777* (2013.01); *B01J 2219/00779* (2013.01); *B01J 2219/0254* (2013.01); *B01J 2219/0286* (2013.01); *B01J 2219/0295* (2013.01); *B01J 2219/085* (2013.01); *B01J 2219/1203* (2013.01)

(58) Field of Classification Search
None
See application file for complete search history.

(56) References Cited

U.S. PATENT DOCUMENTS 2,201,212 A     5/1940  Valentine
3,265,368 A  *  8/1966  Nocera ................ B01F 7/1675
                                                         366/306

(Continued)

OTHER PUBLICATIONS

Written Opinion of the International Searching Authority, WIPO dated Sep. 17, 2015.
International Search Report dated Sep. 17, 2015.

*Primary Examiner* — Kishor Mayekar

(57) ABSTRACT

A mixer reactor apparatus comprising a plurality of baffles positioned within the reactor, the baffle comprising a hollow cylindrical structure with a substantially flattened baffle section between an upper section and a lower section. The apparatus further comprises a lever formed by a portion of the upper section bent at a perpendicular angle, the lever is configured to adjust an impact of the baffle by adjusting a position of the baffle member relative to an interior wall of the reactor.

18 Claims, 3 Drawing Sheets

(56) References Cited

U.S. PATENT DOCUMENTS

| | | | |
|---|---|---|---|
| 4,895,137 | A | 1/1990 | Jones et al. |
| 5,031,795 | A | 7/1991 | Kotera et al. |
| 5,207,905 | A | 5/1993 | O'Brien et al. |
| 5,792,231 | A | 8/1998 | Schwegler |
| 6,200,016 | B1 | 3/2001 | Reinemuth et al. |
| 7,841,647 | B2 | 11/2010 | Niezur et al. |
| 3,042,615 | A1 | 10/2011 | Wattenburg |
| 8,695,352 | B2 | 4/2014 | Bohney et al. |
| 8,734,053 | B1 | 5/2014 | Sackett |
| 8,967,327 | B2 | 3/2015 | Synnestvedt |
| 2006/0163260 | A1 | 7/2006 | Schmidt |
| 2013/0089925 | A1 | 4/2013 | Damren et al. |

* cited by examiner

BAFFLE ASSEMBLY FOR A REACTOR

BACKGROUND OF THE INVENTION

A. Technical Field

The present invention generally relates to components of a reactor apparatus, and more particularly relates to a baffle structure for reactors, the baffles are configured to provide improved fluid mixing, temperature control and minimal damage to the contents of the reactor.

B. Description of Related Art

Reactors are vessels designed to contain reactions. Chemical reactors and bioreactors can be broadly classified into batch reactors, plug flow reactor and continuous stirred tank reactor types. Reactors are commonly used in various fields including pharmaceutical industry, food industry, chemical engineering, nuclear energy and wastewater treatment.

Mixing is one of the most important operations in carrying out a chemical or biochemical processes within a reactor. For example, if mixing is not appropriate in a bioreactor, biological systems would not constitute a suspension of cell mass and substrate concentrations becomes zero, rapidly. This happens when the cells move out from suspension and begins to sediment. Other effects of mixing includes heat transfer, which facilitates to control the temperature of reactor contents. Mixing efficiency is greatly influenced by rheological properties of a fluid. Shear stress and time have different effects on fluid rheology.

Mixing is usually done in a mixer reactor which is often cylindrical in shape. Usually for fluids, the diameter ratio of tank to mixer is 3:1. Typically, a mixer structure is coupled to a center shaft, which is driven by a motor. The mixer rotates the fluid within the reactor vessel to create a regular flow pattern such as a circular flow leading to a vortex. Blades or baffles are generally fixedly attached (for ex: welded) to the wall of the reactor to interfere with such flow pattern thus creating turbulent conditions for mixing and preventing sedimentation.

Prior art reactor containers including reactors with conventional baffle design poses various limitations such as mechanical stress on mixer due to varied fluid rheology which results in increased power consumption. Conventional reactor designs need a thermal jacket structure for temperature control purposes and traditional baffle designs induce damage to sensitive fluid contents or reagent within the reactor. Therefore, there is a need in the art for a reactor apparatus with improved baffle structure for providing fluid mixing, temperature control and minimal damage to the sensitive contents of the reactor.

SUMMARY OF THE INVENTION

The present invention relates to a mixer reactor apparatus, comprising a plurality of baffle members positioned within the reactor. Each of the baffle members comprises a hollow cylindrical structure with an upper section, a lower section and a substantially flattened baffle section in the middle. A portion of the upper section is bent at a perpendicular angle to form a lever member extending from the reactor. The lever member is configured to adjust an impact of the baffle member by adjusting the position of the baffle member relative to an interior wall of the reactor.

In an embodiment, the baffle structure allows passing of a fluid through the hollow cylindrical structure for establishing temperature control by heat transfer. The baffle member design allows for controlling the reaction temperature via heat transfer. In particular, the heat transfer is influenced by the effective surface, diameter and number of baffles and temperature of the fluid passing through the baffle. The structure of baffle also allows to control reaction kinetics based on fluid rheology.

In another embodiment, the baffle structure is adapted to carry a gas within the hollow cylindrical structure. The flattened baffle section comprises a plurality of openings which allows diffusion of gas into the reactor contents.

In another embodiment, the baffle structure is configured to provide minimal damage to the sensitive contents present in the reactor. For example, the baffle structure comprises of blunt ends or curved ends and no sharp edges thus causing only minimal damage to sensitive contents such as plant cells, animal cells and cultivated microorganisms present within the reactor apparatus. The baffle design of the present disclosure minimizes the shear stress induced damage that can occur, for example, to fluid suspensions that comprise live cells, and thereby provides for an improved mechanism by which to mix reactor contents that comprise sensitive components that are susceptible to shear stress-induced damage, breakdown and/or loss of functionality.

One aspect of the present disclosure is directed to a mixer reactor apparatus, comprising at least one baffle member comprising a hollow cylindrical structure with a substantially flattened baffle section between an upper section and a lower section; and a lever member comprising a portion of the upper section bent at a perpendicular angle, configured to adjust a position of the baffle member relative to an interior wall of the reactor. In one embodiment, the baffle member allows passing of a fluid through the hollow cylindrical structure. In another embodiment, the apparatus comprises a plurality of baffle members symmetrically positioned adjacent to the interior wall of the reactor.

In one embodiment, the baffle member allows passing of fluid at different temperatures or gas through the hollow cylindrical structure. In one embodiment, the baffle member comprises blunt edges. In another embodiment, the baffle member allows passing of a gas through the hollow cylindrical structure. In one embodiment, the baffle member further comprises a plurality of openings for distributing the gas into contents of the reactor. In one embodiment, the baffle member is removable and replaceable. In one embodiment, the position of the baffle member is adjustable based on rheological properties of contents of the reactor. In one embodiment, the baffle member comprises a plurality of openings. In another embodiment, these plurality of openings are used as a gas diffuser.

In one embodiment, the baffle member allows passing of fluid at different temperatures, or gas, through the hollow cylindrical structure. In another embodiment, the apparatus further comprises a thermometer, pressure gauge, flow meter, pH meter, one or more UV lamps, and a camera. In one embodiment, the reactor is mounted such that it can be either horizontal or vertical.

In another embodiment, the apparatus further comprises a motor. In one embodiment, the angle of the baffles is controlled using a motor. In another embodiment, the baffles are connected to a central shaft member and the central shaft member is connected to an electric motor. In one embodiment, the apparatus is substantially made from glass, compact polymers, or stainless steel. In another embodiment, the baffles are configured to maximize heat exchange and transfer of energy.

One aspect of the present disclosure is directed to a mixer reactor apparatus, comprising: at least one baffle member comprising a hollow cylindrical structure with a substantially flattened baffle section between an upper section and a lower section; and a lever member comprising a portion of the upper section bent at a perpendicular angle, configured to adjust a position of the baffle member relative to an interior wall of the reactor; wherein said baffle member has a plurality of openings and wherein said at least one baffle member comprises a plurality of baffle members symmetrically positioned adjacent to the interior wall of the mixer reactor apparatus.

In one embodiment, the movement of the lever member can be programmed and/or controlled relative to the rheological properties of contents of the reactor. In another embodiment, the apparatus further comprises a sensor to sense the conditions of the components in the reactor and to adjust how the lever member controls the baffles based on the feedback received from the sensors.

One aspect of the present disclosure is directed to a mixing reactor comprising at least one baffle member comprising a hollow cylindrical structure with a substantially flattened baffle section between an upper section and a lower section; and a lever member connected to a portion of the upper section such that the lever is configured to adjust a position of the baffle member relative to an interior wall of the reactor; wherein at least one portion of said baffle member has a plurality of openings. In one embodiment, the at least one baffle member comprises a plurality of baffle members symmetrically positioned adjacent to the interior wall of the mixer reactor apparatus.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
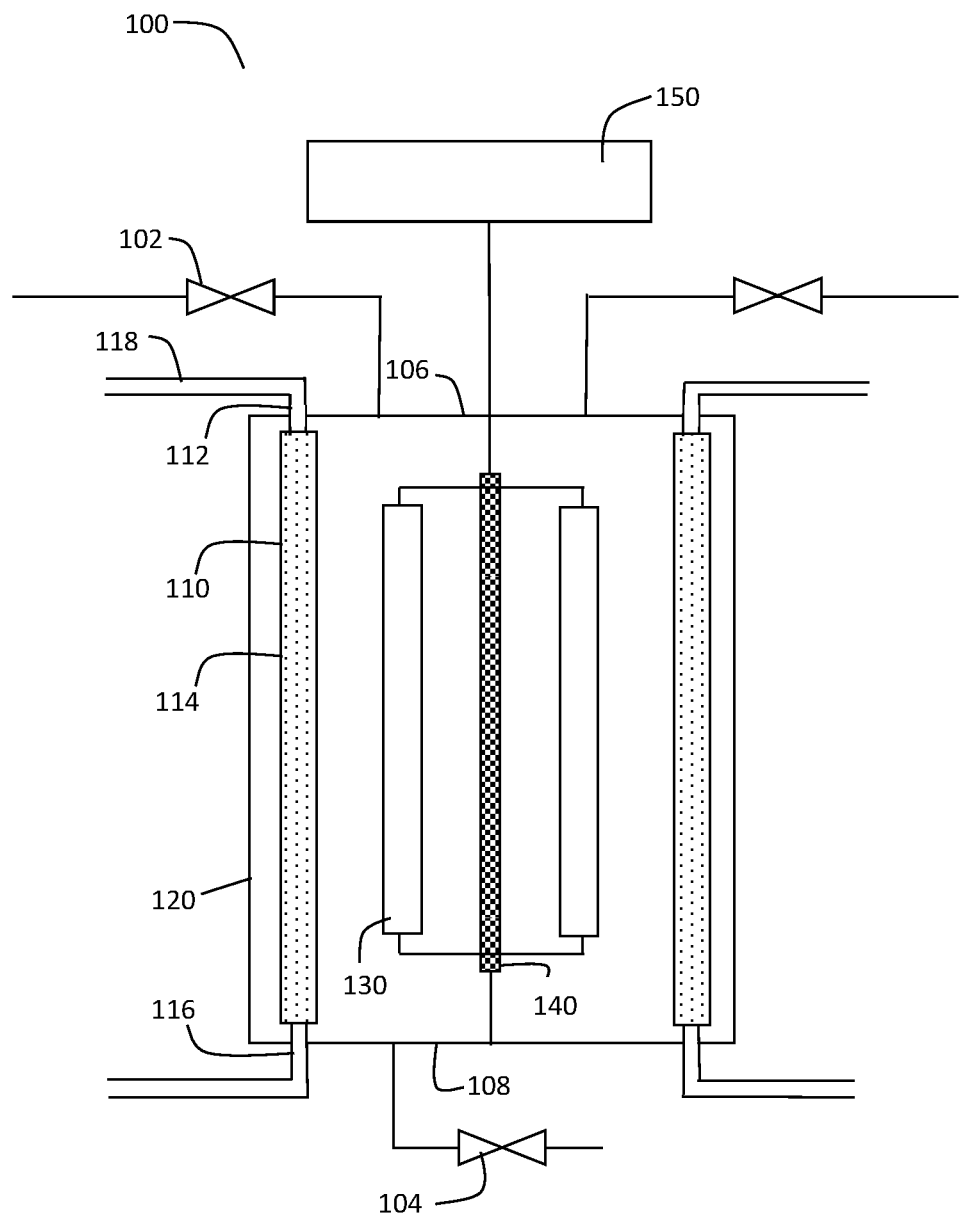
FIG. 1 illustrates a schematic diagram of a reactor comprising baffles.

Referring to FIG. 1, which illustrates a schematic view of a mixer reactor apparatus 100 comprising a plurality of baffle members 110 positioned adjacent to an interior wall 120 of the reactor 100. The baffle member 110 comprising a hollow cylindrical structure with an upper section 112, a lower section 116 and a substantially flattened baffle section 114 in the middle. A portion of the upper section 112 is bent at a perpendicular angle to form a lever member 118 extending from the reactor 100. The lever member 118 is configured to adjust an impact of the baffle member 110 by adjusting the position of the baffle member relative to the interior wall 120 of the reactor 100. For example, by rotating the lever member 118, the position of the flattened baffle section 114 can be adjusted to be parallel to the direction of rotation of mixer, for minimal impact. Alternatively, the position of the flattened baffle section can be adjusted to be perpendicular to the direction of flow, for maximum impact.

The ratio of the reactor height to diameter may be about Height/Diameter=4. In this system, to create turbulent conditions, a mixer 130 is used along with the four baffle members 110. The number of baffles can be increased, according to the cross section of the reactor. The reactor apparatus 100 further comprises a central shaft 140 connected to the mixer 130 comprising at least two steel bars. The central shaft 140 comprises an elongate tube driven by an electromotor 150, the central shaft in turn rotates the mixer 130 for mixing the contents inside the reactor 100. The electromotor 150 can be connected to a number of controlling systems known to those skilled in the art. Further, the reactor 100 comprises compact polymer or stainless steel blockers 106 and 108 on top and bottom of the apparatus respectively. The reactor 100 comprises one or more input valve 102 for supplying reaction contents and one or more output valve 104 for downstream processing.

In an exemplary embodiment, baffles 110 are made of aluminum tubes with 8 mm inner diameter, 280 mm length and 1 mm thickness. The tubes can be stainless steel, any other alloy, glass or types of compact polymers. Care is taken in selecting the tube and contents of the reactor and the fluid passing through the baffle, so as to minimize any possible corrosion or adverse reaction. Tube heat transfer coefficient of each gender should be high. Internal diameter of the tube should be sufficient to allow fluid to pass through the baffle, so as not to create tube fouling. The outer surface of the tubes are kept smooth to improve performance. Increasing the thickness of tube is useful for reducing the torsional stresses on baffle, however, thickness of tube can grow to some extent that does not effectively reduce heat transfer.

Baffle length may be proportional with a length of reactor; if the reactor is longer than one meter, several short baffles can be installed in consecutive order. The baffles may be installed 10 mm away from the interior wall of the reactor 120. In other embodiments where the mixer is short, the baffles may be installed at a greater distance away from the interior wall of the reactor.

The flattened baffle section 114 in the middle comprise 180 mm length, whereas the upper 112 and lower 116 section comprises a length of 30 mm and diameter 10 mm. The central shaft 140 a tube which is 280 mm length and 18 mm outer diameter. The mixer 130 comprises two steel bars which is 30 mm in diameter, connected to either side, 12 mm away from the central shaft 140. Central shaft 140 is connected to electric motor 150 to rotate. In an exemplary embodiment, reactor 120 are made of polyethylene tube with 110 mm internal diameter, 8 mm thickness and 220 mm length. This reactor 120 may be made of stainless steel, any other alloy, glass or types of compact polymers. The volume of the reactor 100 is 1900 ml. Valves 102 and 104 are installed to control entry of raw materials and exiting of products.

Figure 2:
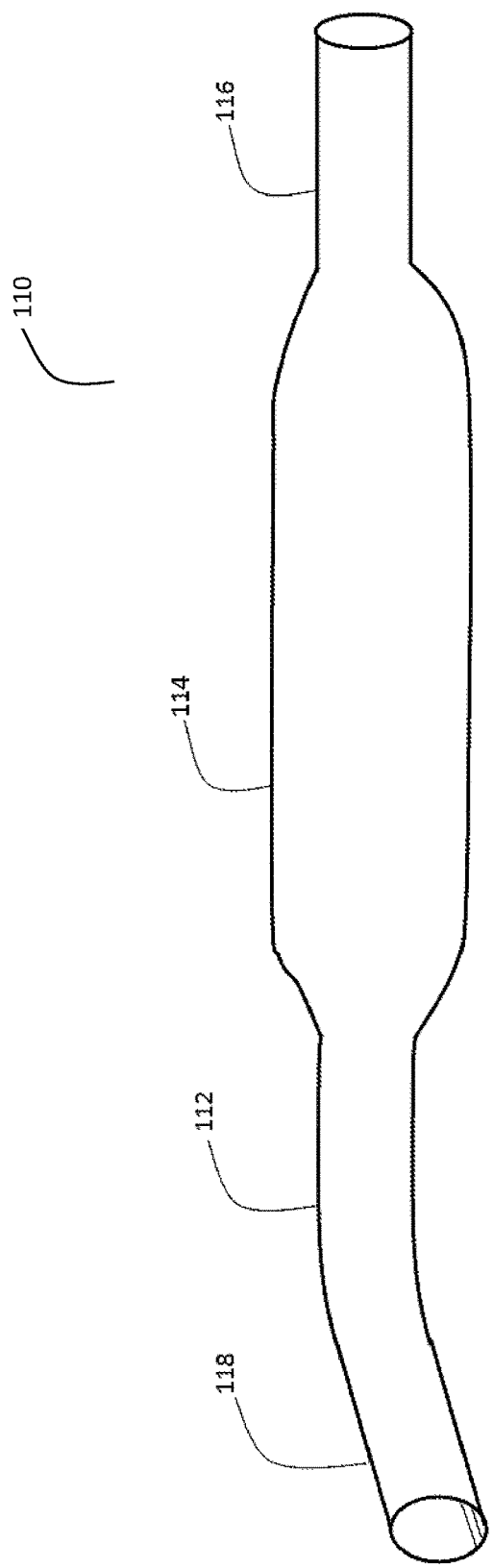
FIG. 2 illustrates a top perspective view of the baffle member.
Figure 3:
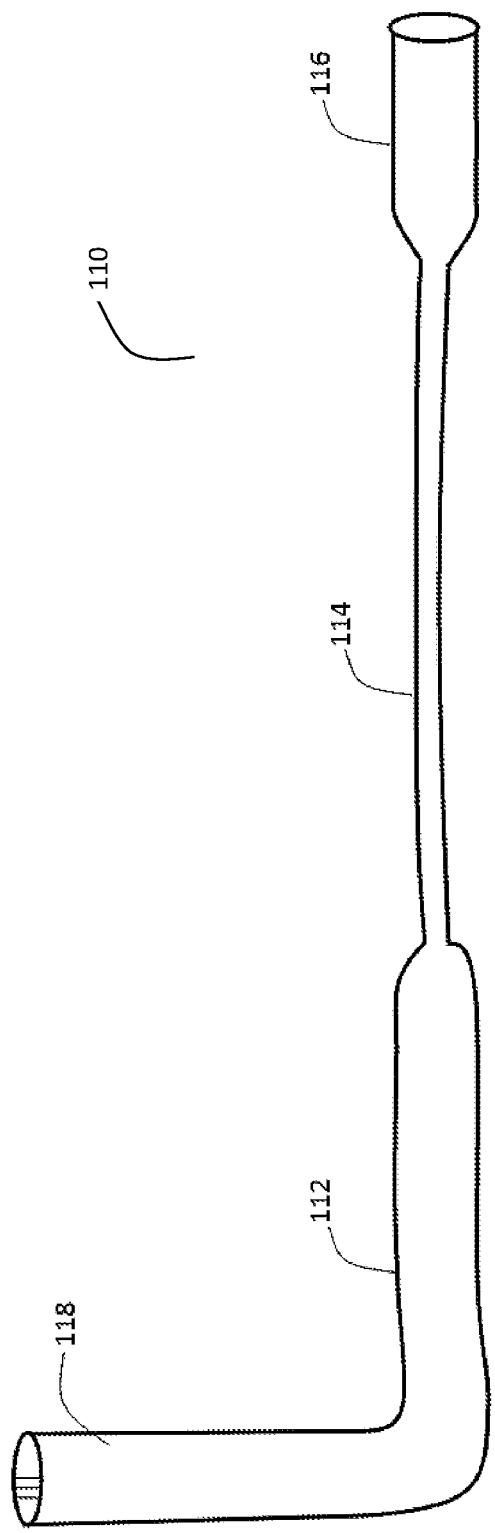
FIG. 3 illustrates a side perspective view of the baffle member.

FIG. 2 and FIG. 3, showing top and side perspective views respectively of the baffle member 110 comprises a hollow tube with a cylindrical upper section 112, a flattened baffle section 114 and a cylindrical lower section 116. The cylindrical upper section 112 and cylindrical lower section 116 can be equipped with bearings, seal, and in the case of larger reactors, by several short consecutive baffle equipped to bearings or motor. The flattened baffle section 114 in the middle creates turbulent condition for a thorough mixing of contents and prevents vortex formation. The impact of the baffles 110 can be adjusted by adjusting the position of the flattened baffle section 114 with respect to the interior wall of the reactor using the lever 118. Lever 118 can be controlled manually or automatically.

The required impact can be determined based on rheological properties of the reagent or reaction contents present within the reactor. A plurality of baffle members 110 are symmetrically positioned adjacent to the interior wall of the reactor for uniform mixing. For example, if the reagent is viscous, the baffle impact can be removed at the start of the process and slowly introduced later. In another example, the baffle impact is removed at an end of the process for allowing faster settling of nanoparticles or cells.

In an embodiment, the cylindrical sections of the baffle member may be hollow. In another embodiment, the hollow cylindrical structure of the baffle member 110 allows passing through a temperature controlled fluid for controlling the reaction temperature via heat transfer. This in turn is influenced by the effective surface area, diameter and number of baffles and temperature of the fluid passing through the baffle. The hollow cylindrical structure of baffle member 110 also allows transport of a gas and diffusion of gas into the contents of the reactor via a plurality of openings (not shown) in one or more of the upper, middle and lower section of the baffle member. The flattened baffle section 114 is formed by pressing the top and bottom sections together using pliers, for example, to an extent such that the passage is unblocked and where the middle baffle section 114 allows fluid or gas to pass through. The baffle member is configured to be easily removable from the reactor and/or easily replaceable.

In another embodiment, the baffle structure of the present invention is configured to provide minimal damage to the sensitive contents present in the reactor. For example, the baffle structure comprises of blunt ends or curved ends and no sharp edges thus causing only minimal damage to sensitive contents such as plant cells, animal cells and cultivated microorganisms present within the reactor apparatus.

Reactor apparatus employed with baffle assembly of the present invention also results in effective mixing, reduced energy consumption, increased life for mixer, reduced shear stress and rapid sedimentation of suspended contents at the end of the process. Further, the baffles can be used for applying thermal and electrical shock to the reactor contents. Baffle structure of the present invention can be employed in reactor apparatus including bioreactors used in pharmaceuticals, food industry, laboratory, wastewater treatment and also in nuclear reactors.

One aspect of the present disclosure is directed to a mixer reactor apparatus 100, comprising at least one baffle member 110 comprising a hollow cylindrical structure with a substantially flattened baffle section 114 between an upper section 112 and a lower section 116; and a lever member 118 comprising a portion of the upper section 112 bent at a perpendicular angle, configured to adjust a position of the baffle member 110 relative to an interior wall 120 of the reactor 100. The baffle member 110 allows passing of a fluid through the hollow cylindrical structure. The apparatus 100 may comprise a plurality of baffle members 110 symmetrically positioned adjacent to the interior wall 120 of the reactor 100. The positioning of the baffle members 110 may, in one example, be in any orientation. The baffle member 110 may comprise a plurality of openings for use as a gas diffuser.

The baffle member may comprise blunt edges. The baffle member may comprise both blunt and straight cut edges. The edges may be of any shape known in the art. The baffle member may allow passing of a gas through the hollow cylindrical structure. The baffle member may further comprise a plurality of openings for distributing the gas into contents of the reactor. The baffle member may be removable and/or replaceable. In one embodiment, the position of the baffle member is adjustable based on rheological properties of contents of the reactor.

The apparatus may further comprise a thermometer, pressure gauge, flow meter, pH meter, one or more UV lamps, and a camera. The reactor may be mounted such that it can be either horizontal or vertical. The apparatus may further comprises a motor. The angle of the baffles can be controlled using a motor and this motor can be programmed to stop and start at certain times and/or react to the conditions of the components in the reactor (e.g. their viscosity) and adjust the angle and/or speed of the baffles. The baffles may be connected to a central shaft member and the central shaft member can be connected to an electric motor. The apparatus may be substantially made from glass, compact polymers, or stainless steel. In one embodiment, the baffles are configured to maximize heat exchange and transfer of energy.

One aspect of the present disclosure is directed to a mixer reactor apparatus, comprising: at least one baffle member comprising a hollow cylindrical structure with a substantially flattened baffle section between an upper section and a lower section; and a lever member comprising a portion of the upper section bent at a perpendicular angle, configured to adjust a position of the baffle member relative to an interior wall of the reactor; wherein said baffle member has a plurality of openings and wherein said at least one baffle member comprises a plurality of baffle members symmetrically positioned adjacent to the interior wall of the mixer reactor apparatus.

The movement of the lever member can be programmed and/or controlled relative to the rheological properties of contents of the reactor. The apparatus further may comprise a sensor to sense the conditions of the components in the reactor (e.g. the viscosity and granularity) and to adjust how the lever member controls the baffles based on the feedback received from the sensors.

One aspect of the present disclosure is directed to a mixing reactor comprising at least one baffle member comprising a hollow cylindrical structure with a substantially flattened baffle section between an upper section and a lower section; and a lever member. The lever member is connected to a portion of the upper section such that the lever is configured to be able to adjust a position of the baffle member relative to an interior wall of the reactor. At least one portion of said baffle member of this mixing reactor may have a plurality of openings. The at least one baffle member may further comprise a plurality of baffle members symmetrically positioned adjacent to the interior wall of the mixer reactor apparatus.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A mixer reactor apparatus, comprising:
   at least one baffle member comprising a hollow cylindrical structure with a flattened baffle section between an upper section and a lower section; and
   a lever member comprising a portion of the upper section bent at a perpendicular angle, configured to adjust a position of the baffle member relative to an interior wall of the mixer reactor.

2. The apparatus of claim 1, wherein the baffle member allows passing of a fluid through the hollow cylindrical structure.

3. The apparatus of claim 1, comprises a plurality of baffle members symmetrically positioned adjacent to the interior wall of the mixer reactor.

4. The apparatus of claim 1, wherein the baffle member comprises blunt edges.

5. The apparatus of claim 1, wherein the baffle member allows passing of gas through the hollow cylindrical structure.

6. The apparatus of claim 5, wherein the baffle member further comprises a plurality of openings for distributing the gas into contents of the mixer reactor.

7. The apparatus of claim 1, wherein the baffle member is removable and replaceable.

8. The apparatus of claim 1, wherein the position of the baffle member is adjustable based on rheological properties of contents of the mixer reactor.

9. The apparatus of claim 1, wherein the baffle member comprises a plurality of openings.

10. The apparatus of claim 1, wherein the baffle member allows passing of fluid at different temperatures through the hollow cylindrical structure.

11. The apparatus of claim 1, wherein the apparatus further comprises a thermometer, pressure gauge, flow meter, pH meter, one or more UV lamps, and a camera.

12. The apparatus of claim 1, wherein the mixer reactor is mounted such that it can be either horizontal or vertical.

13. The apparatus of claim 1, wherein the baffles are connected to a central shaft member and the central shaft member is connected to an electric motor.

14. The apparatus of claim 1, wherein the apparatus is substantially made from glass, compact polymers, or stainless steel.

15. The apparatus of claim 1, wherein the baffles are configured to maximize heat exchange and transfer of energy.

16. A mixer reactor apparatus, comprising: at least one baffle member comprising a hollow cylindrical structure with a flattened baffle section between an upper section and a lower section; and a lever member comprising a portion of the upper section bent at a perpendicular angle, configured to adjust a position of the baffle member relative to an interior wall of the mixer reactor; wherein said baffle member has a plurality of openings and wherein said at least one baffle member comprises a plurality of baffle members symmetrically positioned adjacent to the interior wall of the mixer reactor apparatus.

17. The apparatus of claim 16, wherein movement of the lever member can be programmed and/or controlled relative to the rheological properties of contents of the mixer reactor.

18. The apparatus of claim 16, further comprising a sensor to sense conditions of components in the mixer reactor and to adjust how a lever member positions the baffle members relative to an interior wall of the mixer reactor based on the feedback received from the sensors.

* * * * *